United States Patent [19]

Desserre et al.

[11] 4,447,839
[45] May 8, 1984

[54] MAGNETORESISTANT TRANSDUCER

[75] Inventors: Jacques Desserre, Rambouillet; Michel Helle, Marcq, both of France

[73] Assignee: Compagnie Internationale pour l'Informatique Cii-Honeywell Bull (Societe Anonyme), Paris, France

[21] Appl. No.: 315,027

[22] Filed: Oct. 26, 1981

[30] Foreign Application Priority Data

Oct. 29, 1980 [FR] France ............................ 80 23012

[51] Int. Cl.³ .................... G11B 5/12; G11B 5/30; G11B 21/10; G01R 33/12
[52] U.S. Cl. .................................. 360/113; 360/77; 360/122; 324/210
[58] Field of Search ................. 360/113, 75, 73, 66, 360/123, 125, 103, 126, 124, 77, 122, 119; 324/146, 210

[56] References Cited

U.S. PATENT DOCUMENTS

| | | |
|---|---|---|
| 3,222,754 | 12/1965 | Homan . |
| 3,860,965 | 1/1975 | Voegeli . |
| 3,921,217 | 11/1975 | Thompson ............................. 360/113 |
| 3,940,797 | 2/1976 | Brock . |
| 3,945,038 | 3/1976 | Lazzari . |
| 3,947,889 | 3/1976 | Lazzari ............................. 360/113 |
| 3,975,772 | 8/1976 | Lin . |
| 4,012,781 | 3/1977 | Lin ..................................... 360/113 |
| 4,071,868 | 1/1978 | Kaminaka . |
| 4,179,720 | 12/1979 | Miura ................................. 360/77 |
| 4,195,323 | 3/1980 | Lee ..................................... 360/126 |

OTHER PUBLICATIONS

Shew-"*Increased Density Magnetic Recording*", IBM Tech. Disc. Bull., vol. 2, No. 2, p. 35, Aug. 1959.
Brede and LaPine-"*Shielding Method*", IBM Tech. Disc. Bull., vol. 12, No. 7, p. 958, Dec. 1969.
Patent Abstracts of Japan-Toki-"Magnetic Head", vol. 3, No. 18.

*Primary Examiner*—Robert Martin Kilgore
*Attorney, Agent, or Firm*—Kerkam, Stowell, Kondracki & Clarke

[57] ABSTRACT

A magnetoresistant transducer for reading data present on the tracks of a multitrack magnetic carrier, comprises at least one magnetoresistant element perpendicular to the direction of travel of the data, and first and second magnetic screening means situated at either side of the element.

The magnetoresistant transducer comprises deflecting means for deflecting the magnetic field generated by the current flowing through the element. The deflecting means are situated between the latter and the first and second screening means to intercept and deflect the magnetic field lines transmitted by the data items on the track. The deflecting means includes a plurality of mutually parallel thin magnetic blades separated from each other by thin non-magnetic laminations the thickness of which is such that the magnetic coupling between two adjacent laminations is weak. The laminations and magnetoresistances are of anisotropic material and have their axes of easy and difficult magnetization parallel to each other.

9 Claims, 14 Drawing Figures

MAGNETORESISTANT TRANSDUCER

BACKGROUND OF THE INVENTION

1. Related Applications

The application relates to the invention described in our co-pending application Ser. No. 314,975 filed Oct. 26, 1981, and entitled "A Magnetoresistant Transducer for Reading a Record Carrier Having a High Data Density". The subject matter of said application is hereby incorporated by reference.

2. Field of the Invention

The present invention relates to magnetoresistant transducers and more particularly to magnetoresistant transducers for reading data on multi-track magnetic carriers, such as rigid or flexible magnetic discs and magnetic tapes in which the data density is very high.

3. Description of the Prior Art

It is known that magnetic discs carry data on circular concentric recording tracks which have a radial width no greater than a few hundredths of a millimeter and which commonly cover the greater proportion of both their surfaces, while magnetic tapes carry data on tracks parallel to the tape length. As a rule, a data recorded on a track of a magnetic disc or tape appears in the form of a succession of small magnetic areas referred to as "elementary areas" which are distributed throughout the track length and have magnetic inductions of identical modulus and opposed direction.

The term longitudinal density (or linear density) is used to define the number of data per unit of length measured along the circumference of a track in the case of a magnetic disc, or along the tape length in the case of a magnetic tape.

The means which make it possible either to record data on disc or tapes, or to read data, or finally to implement one or the other of these functions, are referred to as magnetic transducer devices. As a rule, one or more magnetic transducer devices is or are associated with a given carrier, the carrier traveling past and in front of the transducer device or devices.

Increasingly, frequent use is being made of transducer devices which comprise one or more magnetoresistances to read data on discs or tapes. The transducers are denoted by the name "magnetoresistant transducers." It will be recalled that magnetoresistances are electrical resistances having the form of thin layers or films of very small thickness of which the length greatly exceeds the width. The term "thin layer" as used herein denotes a layer having a thickness in the range of several hundred Ångström to several microns.

These magnetoresistances are frequently deposited on a substrate of electrically insulating material. The value of their resistance varies when they are exposed to a magnetic field.

Consider, for example, a measuring magnetoresistance R connected to the terminals of a generator which supplies a current I flowing in the direction of its length, and assume that the magnetoresistance relates to a magnetoresistant transducer associated with a magnetic record carrier and that it is positioned at a very small or non-existent distance from the carrier. When each of the elementary magnetic areas of the carrier passes before the transducer, the magnetic leakage field $H_f$ generated by these areas close to the carrier surface causes a variation $\Delta R$ of the resistance R and therefore a variation $V = I \times \Delta R$ at its terminals, which yields $\Delta V/V = \Delta R/R$, $\Delta R/R$ being referred to as the "magnetoresistance coefficient". This coefficient is commonly of the order of 2% and is very frequently negative.

The electrical signal collected at the terminals of a magnetoresistance has an amplitude independent of the speed of the record carrier.

It will be recalled that the expression "initial magnetic permeability of a magnetic material" is defined as the ratio (B/H) between the induction and the magnetic field when B and H are close to zero on the initial magnetization curve. The initial magnetization curve is the curve defining the variation of B as a function of the magnetic field H when the magnetic material is exposed to a magnetic magnetization field starting from an initial magnetic state of the material defined by B and H being close to zero. In other words, the initial magnetic permeability of the material is equal to the slope of the initial magnetization curve close to the point B=0 and H=0.

It will also be recalled on the other hand that a magnetically isotropic material situated in a plane (which means that its thickness is much smaller than its length and also than its width) has two preferential directions of magnetization which are commonly at right angles to each other, in said plane. One of these is referred to as the "direction of easy magnetization" whereas the other is referred to as the "direction of difficult magnetization". The initial permeability of the material in the direction of difficult magnetization is much greater than the initial permeability of the material in the direction of easy magnetization.

The expression anisotropy field $H_k$ is used to denote the value of the magnetic field H applied to the material in its direction of difficult magnetization, for which the said material is saturated in this direction.

As a rule, the magnetoresistances utilized are formed by a magnetically anisotropic material, for example by an iron-nickel alloy (18% of iron and 82% of nickel). Their axis of easy magnetization is parallel to the direction of the current I and to their length, whereas their axis of difficult magnetization is at right angles to the same. The position of the magnetoresistance(s) of a magnetoresistant transducer compared to the record carrier allocated to it (them), is such that the leakage field of the elementary areas is parallel to its (their) axis of difficult magnetization, which is itself at right angles to the surface of the carrier. If the magnetoresistances are not exposed to any magnetic field, their magnetization (that is to say the magnetic induction within the same) is directed along the direction of the axis of easy magnetization.

It can be demonstrated that it is possible to increase the sensitivity of a magnetoresistance formed by an anisotropic magnetic material, that is to say the voltage of its output signal, as a function of the magnetic field to which it is exposed, by exposing the same to a magnetic polarizing field $H_{pol}$ parallel to its axis of difficult magnetization, as specified in U.S. Pat. No. 3,945,038 under the title: "Improved magnetoresistances and electromagnetic transducer incorporating the same".

The value of the polarising field $H_{pol}$ is selected in such a manner that it causes the magnetization in the magnetoresistances to turn through an angle $\theta$ preferably close to 45° (in this case, the magnetization subtends an angle of 45° with the direction of easy magnetization).

In this case, it is demonstrated that the sensitivity of the magnetoresistance is at a maximum, that is to say that a maximum variation of its resistance and consequently of its output voltage corresponds to a given variation $\Delta H$ of the magnetic field to which it is exposed (other than the field $H_{pol}$).

In current practice, magnetoresistant transducers comprise two parallel magnetoresistant elements (that is to say, their lengths are parallel) separated by a distance of the order of a tenth of a micron. This distance is substantially smaller in any event than the length of the elementary magnetic areas present on each recording track of the magnetic carrier, so that these two magnetoresistances are exposed to a magnetic leakage field generated by the area before which they are positioned, which has the same value.

The two magnetoresistant elements are polarized in such a manner that their magnetizations are turned through an angle of 45° and are at approximately 90° to each other, as set forth in U.S. Pat. No. 3,942,889. The output signal $\Delta v_1$ of the first magnetoresistant element is fed to a first input terminal of a differential amplifier, whereas the output signal $\Delta v_2$ supplied by the second magnetoresistant element, is fed to the second input terminal of the same differential amplifier. Since $\Delta v_1$ is substantially equal to $-\Delta v_2$, a signal which if proportional to $2 \times |\Delta v_1|$ is collected at the output terminals of the two differential amplifiers. The utilization of a differential amplifier renders it possible to effect a substantial reduction of the noise signal as compared to the signal proportional to $2 \times \Delta v$.

The noise signal may be attributed in particular to thermal disturbance in the magnetoresistances, and equally to all the magnetic fields other than the magnetic leakage field generated by the area opposite which the two magnetoresistances are placed.

It is evident that the two magnetoresistant elements are exposed not only to the magnetic leakage field of the area with which they are in alignment, but equally to the resultant of the magnetic leakage fields generated by the magnetic areas situated at either side of the area opposite which these two magnetoresistances are located. If this resultant has a comparatively low value compared to the value of the magnetic leakage field of this area, when the linear data densities are comparatively low, this does not apply when these linear densities are substantial. In these circumstances, the said resultant may be comparatively substantial compared to this magnetic leakage field. It is then necessary to position magnetic screening devices, commonly formed by a set of thin blades of magnetic material which are interconnected and separated by thin non-magnetic layers, at either side of the two magnetoresistant elements. The plane of each of these blades is at right angles to the record carrier and to the direction of travel of the tracks.

The blades forming the magnetic screening devices preferably consist of anisotropic magnetic material. Their axis of difficult magnetization are perpendicular to the magnetic carrier, so that the totality of the lines of the magnetic field generated by the areas enflanking the magnetic area opposite which the magnetoresistances are located, is intercepted by the blades and not by the two magnetoresistant elements.

Each magnetoresistant element of a magnetoresistant transducer of this kind is preferably polarized or biased by the magnetic field generated by the passage of the current through the other magnetoresistant element. Thus, if $H_1$ is the magnetic field generated by passage of the current I through the first magnetoresistant element, the second magnetoresistant element is polarized by this field $H_1$, and conversely if the field $H_2$ is generated by the same current I in the second magnetoresistant element, the first magnetoresistant element is polarized by the field $H_2$. It is obvious that, as a rule, $H_1$ is substantially equal to $H_2$ in absolute value and of opposite sign. It is then sufficient to adjust the intensity of the current I flowing through the two magnetoresistant elements in such a manner that the two elements are each polarized to an angular value of the order of 45° and that the magnetizations in each of these magnetoresistances are then situated at 90° with respect to each other.

In the case in which the magnetoresistant transducers having two magnetoresistant elements comprise magnetic screening devices situated at either side of the latter, the following actions occur:

the magnetic screening devices situated beside the first magnetoresistant element are exposed to the magnetic field $H_1$ generated by the passage of the current I through this element. This field $H_1$ in its turn generates, within the magnetic screening devices, a volumic and surfacial distribution of charges respectively at the inside and on the surface of the section of these screening devices exposed to the field $H_1$. The magnetic charges are greater in number the larger the volume of the magnetic screening devices exposed to the field $H_1$ and the greater the intensity of this field. A more detailed explanation of this action may be found in the book by W. F. BROWN under the title "Principes de Ferromagnetisme" in chapters II and III, published by Editions Dunod in 1970, and equally in the book by Duranc, in chapter VI, sub-section I, para. 3, page 302, and chapter VIII, published by Masson in 1968.

It is evident that identical actions occur in the magnetic screening devices situated beside the second magnetoresistant element and exposed to the field $H_2$ generated by passage of the current I through this element. The magnetic charges generated within the magnetic screening devices (assuming these to be the first magnetic screening devices situated beside the first magnetoresistant element, the actions produced by the other magnetic screening devices obviously being identical) generate for their part a magnetic field referred to as a "magnetic return field" which tends to oppose the magnetic field $H_1$ which had generated the said charges. $H_r$ denotes return field. The absolute value of $H_r$ is substantially equal to a third of the field $H_1$, equally considered in absolute value. It is then apparent that, in these circumstances, the polarizing field of the second magnetoresistant element is no longer $H_1$ but $H_1-H_r$. It is equally demonstrable that the magnetic polarizing field of the first magnetoresistant element is no longer $H_2$ but $H_2-H_r$. The magnetoresistances are no longer polarized at 45°, but at an angle of lesser value, which has the result of reducing their sensitivity (that is to say the ratio $\Delta R/\Delta H$) compared to what it had been when they were polarized at 45°. Furthermore, the signals delivered are no longer linear. It is obviously possible to eliminate this disadvantage by raising the current intensity in the two magnetoresistances to increase the intensities of the fields $H_1$ and $H_2$ to regain a polarization angle of the magnetoresistances of the order of 45°, but this implies excessive heating of the magnetoresistances on the one hand, and on the other hand requires an increase of the power needed to polarize these.

SUMMARY OF THE INVENTION

The present invention makes it possible substantially to reduce or to eliminate this shortcoming by reducing the volume of the magnetic screening devices exposed to the magnetic field generated by the passage of the current through the magnetoresistances on the one hand, and by reducing the intensity of this field on the other hand.

This is accomplished by interpositioning, between the magnetoresistances and the magnetic screening devices, magnetic devices for deflection of the magnetic field generated by the magnetoresistant elements, in such a manner that the field is deflected towards the parts of the magnetic screening devices which are farthest from the magnetic record carrier. It may be said that the magnetic field deflector devices play the part of a screen for the magnetic fields generated by the magnetoresistant elements.

In accordance with the invention, there is provided a magnetoresistant transducer for reading data on a magnetic carrier and within a plurality of tracks, comprising:

at least one magnetoresistant element disposed perpendicular to the direction of travel of the data and traversed by a current flowing in the direction of its length, first and second magnetic screening devices situated at either side of the element, for intercepting the magnetic flux of the data situated at either side of the data of the track situated in front of this element, and the invention is characterized in that it comprises magnetic devices for deflecting the magnetic field generated by the current flowing in the element, the magnetic devices being positioned between the element and the first screening devices on the one hand and between the element and the second screening devices on the other hand.

BRIEF DESCRIPTION OF THE DRAWINGS

Other features and advantages of the present invention will appear from the following description given by way of non-limiting example, and with reference to the accompanying drawings, in which:

FIG. 7 shows a preferred embodiment of a magnetoresistant transducer in accordance with the invention, and includes:

FIG. 8 illustrates a second embodiment of a magnetoresistance transducer in accordance with the invention, and includes:

DESCRIPTION OF THE PREFERRED EMBODIMENTS

Figure 1B:
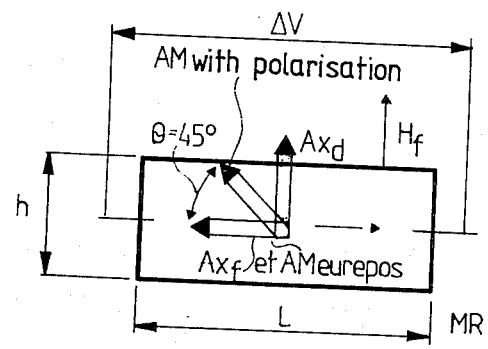
FIG. 1 graphically describes the principle of operation of an elementary magnetoresistant transducer comprising a single magnetoresistance of anisotropic magnetic material, and includes.
FIG. 1a which is a three-quarter perspective view showing a magnetoresistance situated opposite a track of a magnetic record carrier, and FIG. 1b showing the manner in which the magnetoresistance is positioned with respect to the magnetic leakage field of the data present on the recording track.
Figure 1A:
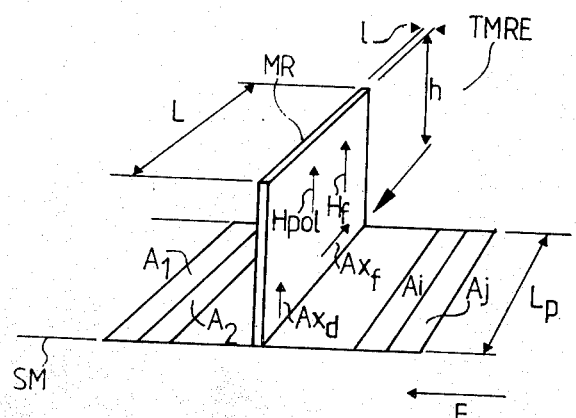
Figure 2:
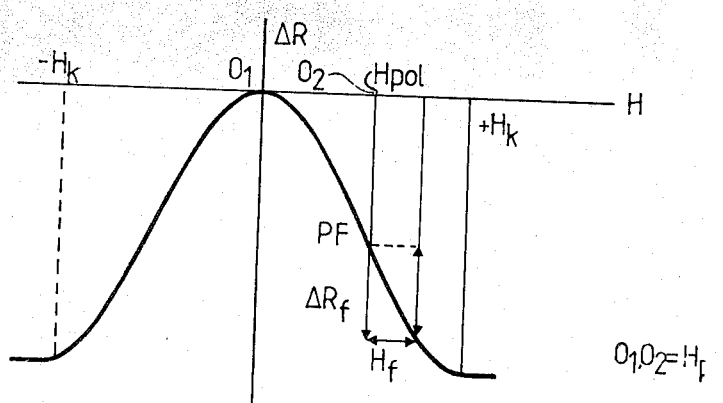
FIG. 2 graphically illustrates the curve of the variation of a magnetoresistance of anisotropic magnetic material as a function of the magnetic field applied to it in the direction of its axis of difficult magnetization, and makes it possible to gain a clearer grasp of the principle of the polarization of a magnetoresistance.

In order to provide a clearer understanding of the structure of a magnetoresistant transducer in accordance with the invention, it may be helpful to recall some facts regarding the principles of operation of the magnetoresistances illustrated by FIGS. 1a, 1b and 2, and the magnetoresistances in accordance with the prior art, as illustrated by FIGS. 3a, 3b, 3c, 4, 5, 6a and 6b.

Referring first to FIGS. 1a and 1b which illustrate an elementary magnetoresistant transducer TMRE formed by a single magnetoresistance MR, and in particular to FIG. 1a, the magnetoresistance MR is shown arranged in alignment with or opposite the track P of a magnetic record carrier SM such as a magnetic tape. The width L of the magnetoresistance is of the order of magnitude of the width $L_p$ of the track P, its height h measured at right angles to the carier SM and is, for example, of the order of 30 to 40 microns. The length L is greater than the width 1. At its two extremities, the magnetoresistance MR has connecting conductors (not illustrated in order to simplify FIG. 1a) which make it possible to connect the transducer to electronic circuits for detecting the data contained on the carrier SM. The axis $Ax_f$ of easy magnetization of the magnetoresistance MR is parallel to its length, and its axis $Ax_d$ of difficult magnetization extends at right angles to this larger dimension and to the carrier SM. The magnetoresistance MR is supplied with a current I which, for example, flows in the direction shown in FIG. 1a and 1b, that is to say parallel to the axis $Ax_f$ of easy magnetization.

The magnetoresistance MR is exposed to the magnetic leakage field $H_f$ of the elementary magnetic areas of the carrier, (some of these areas, namely $A_1, A_2, A_i, A_j$, are illustrated in FIG. 1a), this leakage field being at right angles to the record carrier and thus parallel to the axis $Ax_d$ of difficult magnetization of the magnetoresistance MR.

FIG. 2, which shows the curve of the variation $\Delta R$ of the resistance R of the magnetoresistance MR as a function of the magnetic field H applied to it along its axis of difficult magnetization $Ax_d$, makes it possible to gain a clearer grasp of the operation of the elementary magnetoresistant transducer TMRE.

It is apparent that for a value of H equal to the anisotropy field $H_k$ of the material forming the magnetoresistance, the material is saturated in its direction of difficult magnetization, the resistance R no longer varies. It is possible to impart maximum sensitivity to the magnetoresistance MR by shifting the ordinate axis of FIG. 2 from the origin $O_1$ to the origin $O_2$ by exposing it to a polarizing or biasing field $H_{pol}$ as disclosed in the aforesaid U.S. Pat. No. 3,945,038.

This field $H_{pol}$ (generated by an extraneous source which is not shown so as to simplify FIG. 1a) is parallel to the axis of difficult magnetization $Ax_d$ of the magnetoresistance MR and thus parallel to the magnetic leakage field $H_f$ of the data of the carrier SM, that is to say that it is at right angles to the plane of the record carrier. It is shown that, in the case in which the magnetoresistance is exposed to this magnetic polarizing field, the variation $\Delta R$ of the magnetoresistance is comparatively substantial and may even be a maximum for a definite value of the polarizing field $H_{pol}$ corresponding to a rotation through an angle close to 45° of the direction of magnetization (the magnetization being parallel to the axis of easy magnetization $Ax_f$ if the magnetoresistance is not exposed to any magnetic field). Thus, a comparatively small modification $\Delta H$ of the magnetic field applied to the magnetoresistance causes a comparatively great variation $\Delta R$ of its resistance. A point of operation PF for which the abscissa $O_1, O_2$ is equal to $H_{pol}$, is thus defined. If the magnetoresistance is exposed to the magnetic leakage field $H_f$ of the data of the carrier, its resistance variation is $\Delta R_f$ and the voltage collected at its terminals is then $\Delta V = I \times \Delta R_f$. It is shown that, around the point of operation PF, the resistance variation as a function of the magnetic leakage field applied to the magnetoresistance in the direction of its axis of difficult magnetization is then a linear function of this field.

Figure 3A:
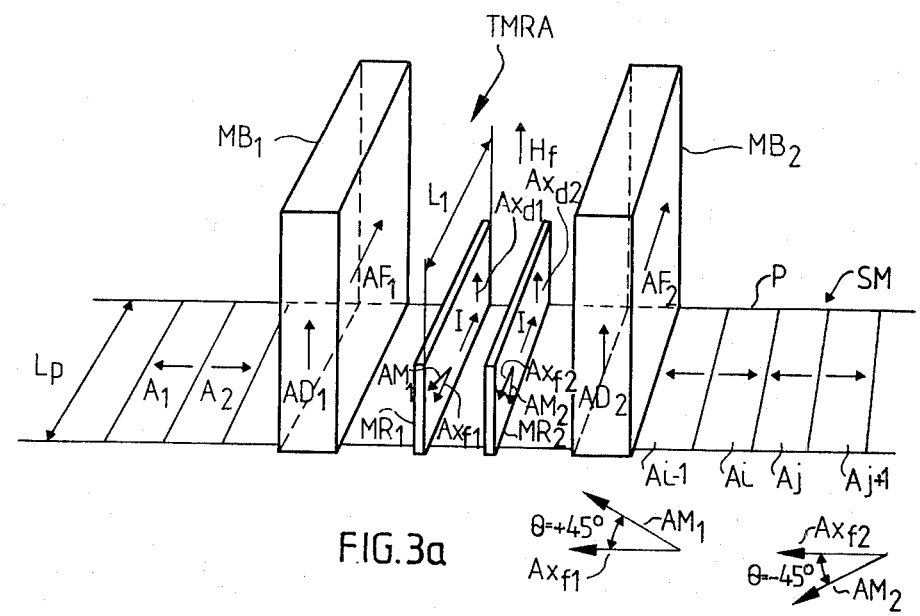
FIG. 3a which is a three-quarter perspective view showing a magnetoresistant transducer, and FIG. 3b which is a fragmentary sideview of the arrangement of FIG. 3a, and FIG. 3c which is a view from above showing the two magnetoresistances above a magnetic area of the recording track of the carrier.
Figure 3B:
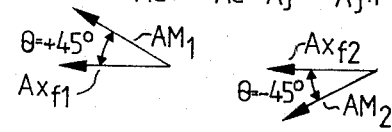
FIG. 3 shows a magnetoresistance transducer comprising two parallel magnetoresistances and screening devices in accordance with the prior art, and includes.
Figure 3B:
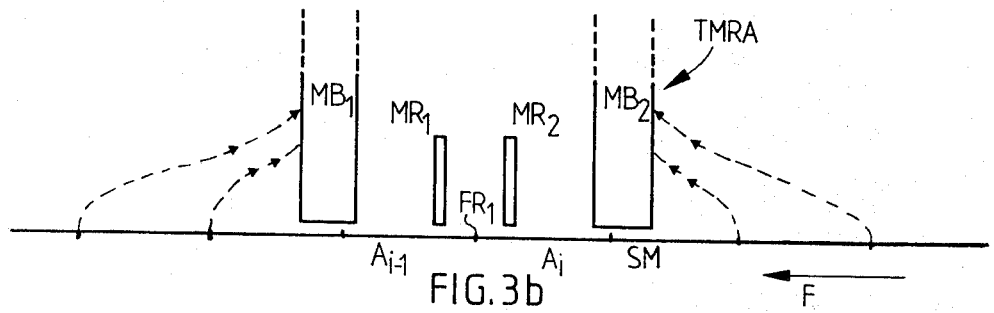
Figure 3C:
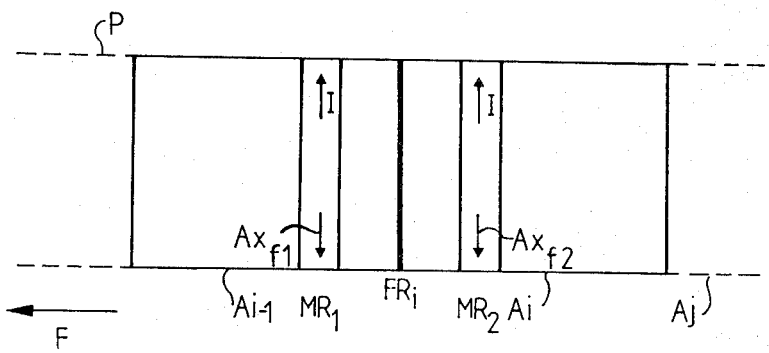

FIGS. 3a, 3b and 3c show a magnetic transducer in accordance with the prior art, as produced in current practice. Let TMRA denote this transducer. Such a transducer comprises:

a first magnetoresistance $MR_1$,
a second magnetoresistance $MR_2$,
first magnetic screening devices $MB_1$,
second magnetic screening devices $MB_2$.

It is clear that the corresponding distances between the different elements forming the transducer TMRA have been shown considerably enlarged in FIGS. 3a, 3b and 3c in order to clarify the latter. For the same reason, the non-magnetic layers which separate these elements, namely the elements $MB_1$ and $MR_1$, the elements $MR_1$ and $MR_2$, and the elements $MR_2$ and $MB_2$, have not been illustrated. Moreover, these non-magnetic layers are also electrically insulating.

The transducer TMRA is shown arranged aligned with the track P of a record carrier SM of which some elementary magnetic areas have been shown, namely the areas $A_1, A_2, A_{i-1}, A_i, A_j, A_{j+1}$. The elements $MR_1$ and $MR_2$ are strictly identical to the element MR shown in FIGS. 1a and 1b and are traversed by a current I in the direction of their length. Let $L_1$, $Ax_{f1}$, $Ax_{d1}$ respectively denote the length, the axis of easy magnetization and the axis of difficult magnetization of the magnetoresistance $MR_1$. Similarly, let $L_2$, $Ax_{f2}$, $Ax_{d2}$ respectively denote the length, the axis of easy magnetization and the axis of difficult magnetization of the magnetoresistance $MR_2$. The lengths $L_1$ and $L_2$ are substantially equal to each other and close to the width $L_p$ of the track P.

The two magnetoresistances are polarized in the following manner. The magnetization $AM_1$ of the magnetoresistance $MR_1$ subtends an angle of $+45°$ with the axis of easy magnetization $Ax_{f1}$, that is to say with the position which the magnetization $AM_1$ had when the magnetoresistance $MR_1$ was inactive; whereas the magnetization $AM_2$ of the magnetoresistance $MR_2$ subtends an angle of $-45°$ with the axis of easy magnetization $Ax_{f2}$, that is to say with the position which the magnetization $AM_2$ had when the magnetoresistance $MR_2$ was not exposed to any magnetic field (when at rest). It is thus apparent that the magnetizations $AM_1$ and $AM_2$ of the magnetoresistances $MR_1$ and $MR_2$ subtend an angle of 90° between them.

The magnetic screening devices $MB_1$ and $MB_2$, preferably produced from anisotropic magnetic material, have an axis of easy magnetization, $AF_1$ and $AF_2$ respectively, and an axis of difficult magnetization $AD_1$ and $AD_2$, respectively. The axes $AF_1$ and $AF_2$ are parallel to the axes $Ax_{f1}$ and $Ax_{f2}$, whereas the axes of difficult magnetization $AD_1$ and $Ad_2$ are parallel to the axes of difficult magnetization $Ax_{d1}$ and $Ax_{d2}$.

These magnetic screening means $MB_1$ and $MB_2$ preferably comprise a plurality of thin magnetic blades which are mutually parallel and separated by non-magnetic layers. These different blades are not shown in FIG. 3a, in order to simplify this figure.

As shown more particularly in FIG. 3c, the distance between the two magnetoresistances $MR_1$ and $MR_2$ must be sufficiently small for these to be exposed to the same magnetic leakage field $H_f$ in practice, data read-out then being performed when $MR_1$ and $MR_2$ are substantially equidistant from the boundary $FR_i$ separating the magnetic areas $A_i$ and $A_{i-1}$ of the track P of the carrier SM.

The screening means $MB_1$ and $MB_2$ render it possible, as is apparent from FIG. 3b, to channel and intercept the magnetic field lines of the resultant of the magnetic leakage fields generated by the magnetic areas of the track P which are situated to either side of the areas $A_{i-1}, A_i$ opposite the boundary of which are situated the two magnetoresistances $MR_1$ and $MR_2$. The magnetoresistances $MR_1$ and $MR_2$ are not therefore exposed to this resultant, because of the presence of the screening means $MB_1$ and $MB_2$.

Figure 4:
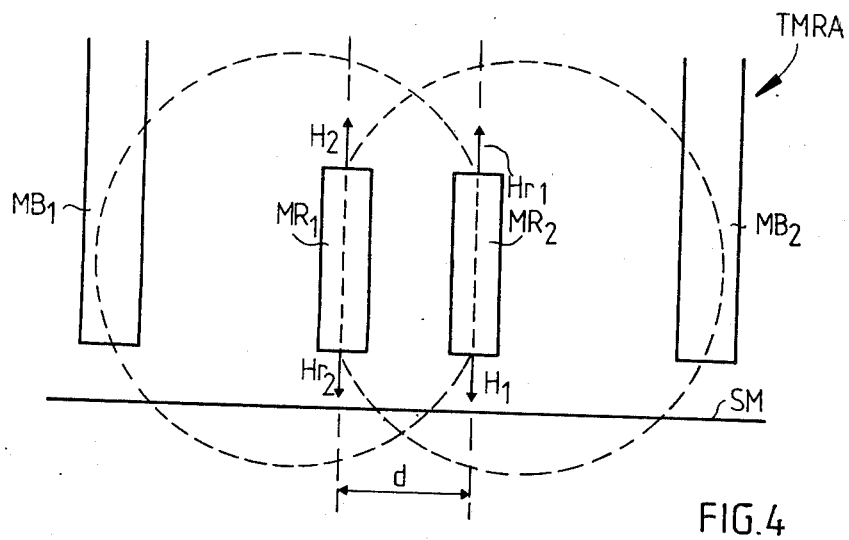
FIG. 4 is a view in cross-section of the magnetoresistant transducer of FIG. 3, and shows the respective principal magnetic field lines of the magnetic fields generated by passage of the current through the first and second magnetoresistances.

Consider now FIG. 4. Let d be the distance separating the magnetoresistances $MR_1$ and $MR_2$. It is assumed that their width is much smaller than this distance d. This means that the distance d separating them is equally that which separates their axes of symmetry perpendicular to the record carrier SM as is apparent from FIG. 4.

Figure 6A:
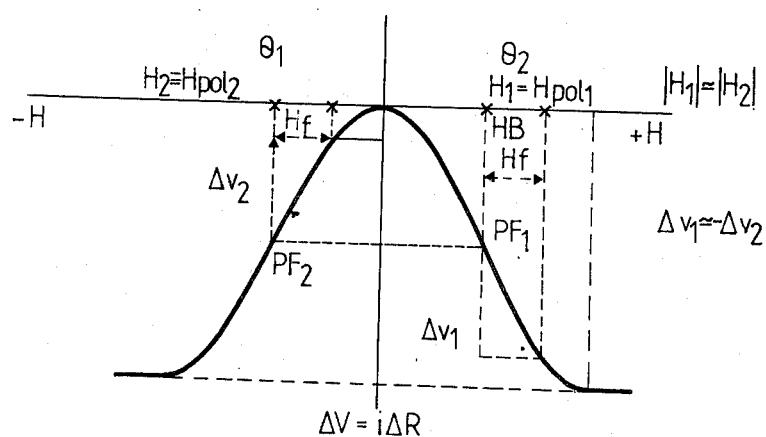
FIG. 6 comprises FIGS. 6a and 6b each of which shows the curve of the variation of the resistance of the magnetoresistances as a function of the field applied to them, and makes it possible to gain a clearer grasp of the disadvantages of prior art magnetoresistant transducers.
Figure 5:
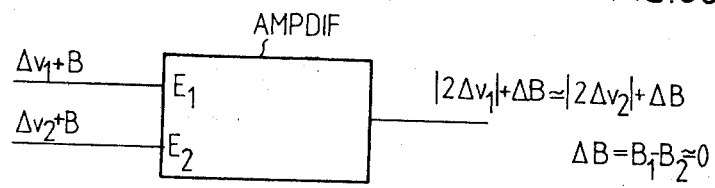
FIG. 5 is a block diagram which shows how the signals collected at the terminals of the magnetoresistances are transmitted to a differential amplifier.

Also consider FIG. 6a.

Let $H_{pol1}$ and $H_{pol2}$ with $|H_{pol1}|=|H_{pol2}|$ be the magnetic polarizing fields of the magnetoresistances MR$_1$ and MR$_2$, such that the magnetizations AM$_1$ and AM$_2$ subtend angles $\theta_1$ and $\theta_2$, equal respectively to $+45°$ and $-45°$, with the axes of easy magnetization Ax$_{f1}$ and Ax$_{f2}$. The points of operation PF$_1$ and PF$_2$ are defined in this manner. If MR$_1$ and MR$_2$ are exposed to the same magnetic leakage field H$_f$, then the voltage variations obtained across their terminals are $\Delta v_1$ and $\Delta v_2$, respectively. These are fed, respectively, to the input terminals E$_1$ and E$_2$ of a differential amplifier AMPDIF (see FIG. 5). At the first input terminal is thus present a signal $\Delta v_1 + B_1$, in which B$_1$ is a noise signal (caused in particular by the magnetic data of the tracks adjacent to the track P, to thermal disturbance in the two magnetoresistances, etc . . . ). A signal $\Delta v_2 + B_2$ is present at the input terminal E$_2$ of the differential amplifier AMPDIF.

As is apparent by examination of FIG. 6a, $\Delta v_2 = -\Delta v_1$, there is consequently obtained at the output terminal of the amplifier AMPDIF, a signal which is proportional in absolute value to $|2\Delta v_1| + \Delta B = |2\Delta v_2| + \Delta B$ in which $\Delta B = B_1 - B_2$, with $\Delta B$ being very small because B$_1$ is close to B$_2$.

It is apparent that the utilization of a differential amplifier enables to obtain an output signal proportional to twice the output signal of a single magnetoresistance.

Let it be assumed initially that the screening means MB$_1$ and MB$_2$ do not act on the magnetic fields generated by passage of the current I through the magnetoresistances, at a distance d from these (from the point of view of the distribution of the magnetic fields generated in the magnetoresistances, the effect would then be as though the magnetoresistant transducer were not provided with screening means MB$_1$ and MB$_2$).

It is then assumed that the magnetic fields H$_1$ and H$_2$ generated by the passage of the current I through the magnetoresistances MR$_1$ and MR$_2$ at a distance d from these are equal, respectively, to H$_{pol1}$ and H$_{pol2}$. Let I$_{SB}$ be the intensity of the current flowing through the magnetoresistances which makes it possible to obtain these values H$_1$ and H$_2$ (which generate the polarization by plus or minus 45° of the two magnetoresistances. The points of operation are PF$_1$ and PF$_2$ (see FIG. 6a).

Let us now assume that the presence of the magnetic screening means MB$_1$ and MB$_2$ has an effect, not only on the distribution of the magnetic field lines H$_1$ and H$_2$ generated by passage of current I of intensity I$_{SB}$ through the magnetoresistances MR$_1$ and MR$_2$, but equally on the intensity of this field.

As stated above, the means MB$_1$ are exposed to the magnetic field H$_1$. This latter causes generation within and on the surface of the magnetic means MB$_1$, of a plurality of magnetic charges which, for their part, generate a magnetic return field H$_{r1}$ opposed in direction to that of the field H$_1$. Similarly, the screening means MB$_2$ exposed to the field H$_2$ generate a magnetic return field H$_{r2}$ at the level of the magnetoresistance MR$_2$ opposed in direction to the field H$_2$.

It is shown that intensity of the magnetic return fields H$_{r1}$ and H$_{r2}$ is close to a third of the intensity of the fields H$_1$ and H$_2$ and is a function on the one hand of the number of magnetic charges comprised by the magnetic screening means MB$_1$ and MB$_2$, this number itself being a function of the volume and surface of these means MB$_1$ and MB$_2$ which are exposed to the magnetic fields H$_1$ and H$_2$, and on the other hand of the intensity of these fields H$_1$ and H$_2$.

Figure 6B:
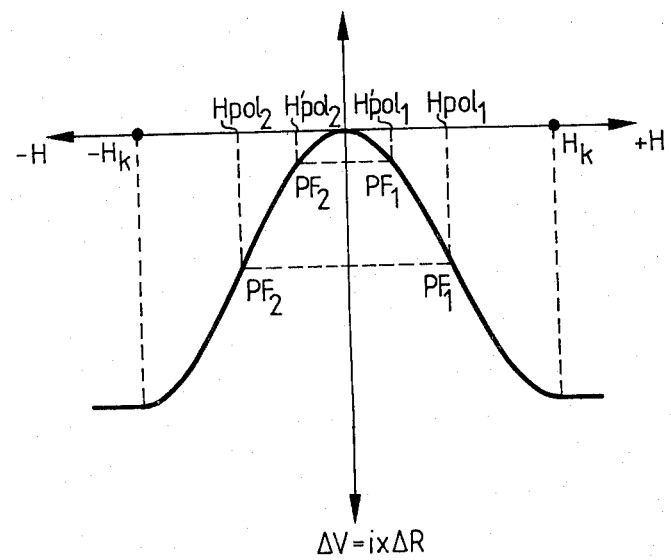

With reference to FIG. 6b, it is consequently apparent that the magnetic polarizing fields which result and to which the magnetoresistances MR$_1$ and MR$_2$ are exposed, are H'$_{pol1}$ and H'$_{pol2}$ respectively, with $$H'_{pol1} = H_1 - H_{r1} \text{ and}$$

$$H'_{pol2} = H_2 - H_{r2}.$$

Consequently: $|H'_{pol1}| < |H_{pol1}|$ and $|H'_{pol2}| < |H_{pol2}|$.

The result is that the points of operation are not longer PF$_1$ and PF$_2$, but PF'$_1$ and PF'$_2$. The sensitivity of the magnetoresistances is then reduced considerably and the resistance variations and consequently voltage variations at the terminals of these are no longer linear as a function of the magnetic leakage field applied to them.

For MR$_1$ and MR$_2$ to regain their initial points of operation PF$_1$ and PF$_2$, the intensity of the fields H$_1$ and H$_2$ should therefore be increased so that H'$_{pol1}$ and H'$_{pol2}$ are substantial: equal to H$_{pol1}$ and H$_{pol2}$. This means that the intensity of the current flowing through the magnetoresistances should be increased substantially, that is to say to obtain an intensity I$_B$ greatly exceeding I$_{SB}$. It is apparent that this leads to complementary heating of the magnetoresistance and that it is necessary to make use of more powerful sources of supply. Furthermore, the noise signals generated by the magnetoresistance are much more powerful.

Figure 7A:
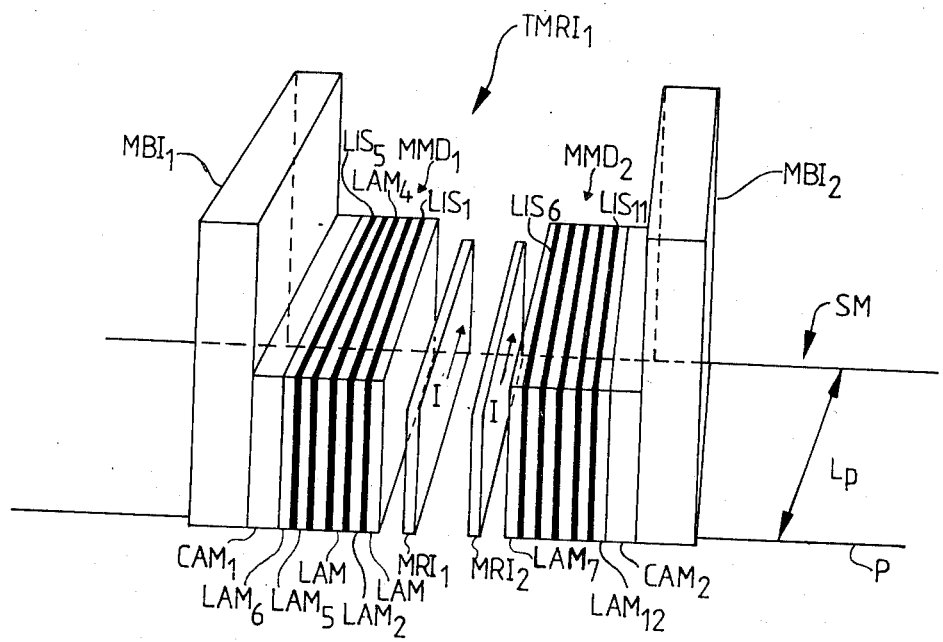
FIG. 7a which is a three-quarter perspective view.
Figure 7B:
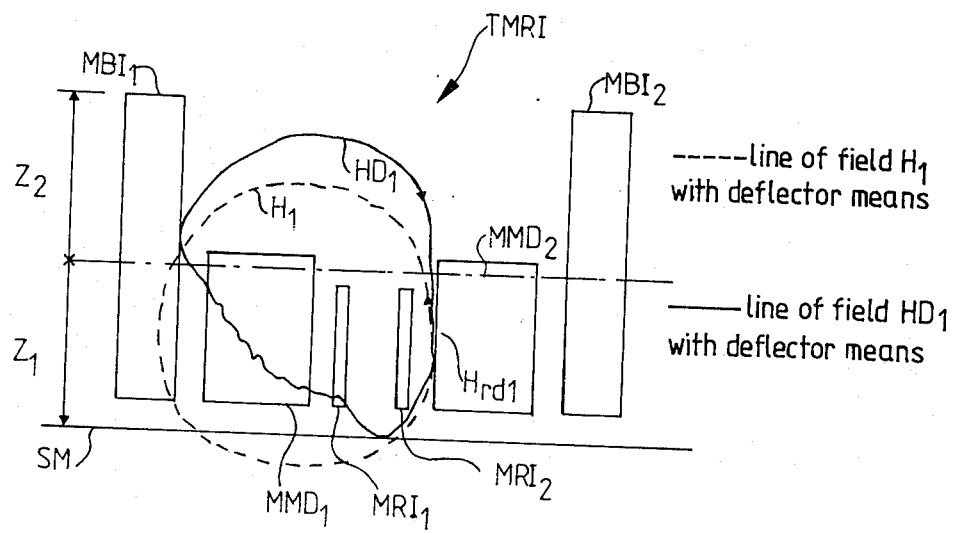
FIG. 7b which is a sideview showing the deformation undergone by one of the principal magnetic field lines of the magnetic field generated by one of the two magnetoresistances of the transducer in accordance with the invention.
Figure 8A:
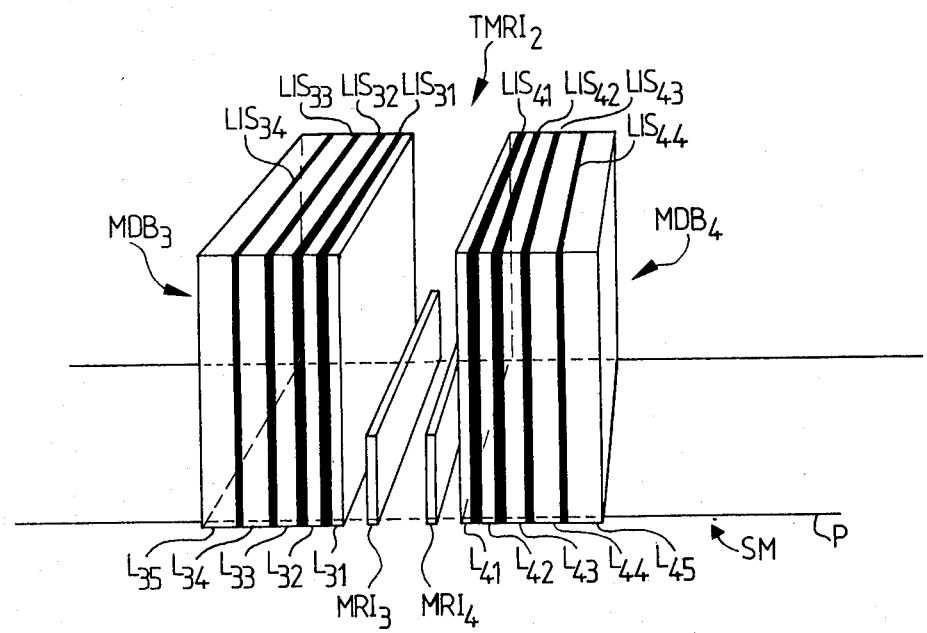
FIG. 8a which is a three-quarter perspective view.
Figure 8B:
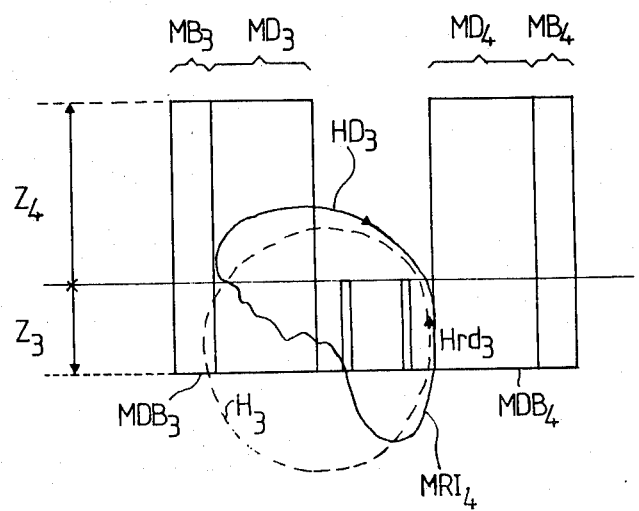
FIG. 8b which is a sideview showing the deformation of one of the principal field lines of the magnetic field generated by one of the two magnetoresistances of the transducer in accordance with the invention.

FIGS. 7a and 7b on the one hand, and FIGS. 8a and 8b on the other hand, show two embodiments of magnetoresistant transducers TMRI$_1$ and TMRI$_2$ in accordance with the invention, which make it possible to eliminate the shortcomings of the magnetoresistant transducers according to the prior art, such as the transducer TMRA.

The principle of the invention consists in minimizing the volume and the surface of the screening means which are exposed to the magnetic fields H$_1$ and H$_2$ of the two magnetoresistances of these transducers, in reducing the intensity of H$_1$ and H$_2$ within and at the surface of these magnetic screening means, and thereby in causing a considerable reduction or even cancellation of the magnetic return fields H$_{r1}$ and H$_{r2}$. This is accomplished by positioning between the first magnetoresistance and the magnetic screening means adjacent to it, magnetic means for deflecting the magnetic field generated by passage of the current through the former, and similarly by positioning second magnetic means for deflecting the magnetic field generated by this second magnetoresistance between the second magnetoresistance and the magnetic screening means adjacent to the same.

Consider FIGS. 7a and 7b which illustrate a first preferred embodiment TMR$_{i1}$ of a magnetoresistant transducer in accordance with the invention.

This comprises:
the two magnetoresistances MRI$_1$ and MRI$_2$ parallel to each other;
the magnetic screening means MBI$_1$ and MBI$_2$;
the magnetic deflection means MMD$_1$ and MMD$_2$.

The two magnetoresistances MRI$_1$ and MRI$_2$ are of a type strictly identical to that of the magnetoresistances MR$_1$ and MR$_2$ of the transducer TMRA in accordance with the prior art. They are produced from anisotropic magnetic material, their lengths are substantially equal to the track width L$_p$ of the carrier SM in front of which is situated the transducer TMRI. Their axes of easy and difficult magnetization $Ax_{f1}$, $Ax_{f2}$, $Ax_{d1}$, $Ax_{d2}$ of the magnetoresistances $MR_1$ and $MR_2$ of the transducer TMRA illustrated in FIG. 3a. Similarly, the two magnetoresistances $MRI_1$ and $MRI_2$ are polarized in the same manner as the magnetoresistances $MR_1$ and $MR_2$.

The magnetic means $MMD_1$ and $MMD_2$ for deflection of the magnetic field generated by the two magnetoresistances $MRI_1$ and $MRI_2$ are strictly identical. Each comprises a plurality of thin magnetic blades which are mutually parallel and separated from each other by thin non-magnetic layers.

Thus, the means $MMD_1$ illustrated in FIG. 7a comprises, for example, six thin magnetic blades $LAM_1$, $LAM_2$, $LAM_3$, $LAM_4$, $LAM_5$, and $LAM_6$, between which are situated blades $LIS_1$, $LIS_2$, $LIS_3$, $LIS_4$, $LIS_5$ of non-magnetic material.

Similarly, the magnetic deflection means $MMD_2$ comprise a plurality of thin magnetic blades $LAM_7$ to $LAM_{12}$ separated from each other by thin non-magnetic blades $LIS_6$ and $LIS_{11}$.

The blades $LAM_1$ to $LAM_6$, $LAM_7$ to $LAM_{12}$ are preferably of anisotropic magnetic material, their axes of easy and difficult magnetizations being parallel, respectively, to the axes of easy and difficult magnetizations of the magnetoresistances $MRI_1$ and $MRI_2$.

The thickness of the thin insulating layers $LIS_1$ to $LIS_5$ on the one hand, and $LIS_6$ to $LIS_{11}$ on the other hand, is such that the magnetic coupling between the magnetic blades between which they are situated is comparatively small. The magnetic deflection means $MMD_1$ are separated from the magnetic screening means $MBI_1$ by a thin layer of a non-magnetic material $CAM_1$, whereas the magnetic deflection means $MMD_2$ are separated from the magnetic screening means $MBI_2$ by an non-magnetic layer $CAM_2$, identical to $CAM_1$.

The two magnetoresistances $MRI_1$ and $MRI_2$ are separated from each other by thin electrically insulating magnetic layers, and are each separated from the magnetic deflection means adjacent to them by non-magnetic and equally electrically insulating layers, which are not shown in order to simplify FIG. 7a.

From this same figure, and equally from FIG. 7b, it is apparent that the magnetic and non-magnetic blades or laminations of the magnetic deflection means have a height (approximately 30 to 50 microns) which is smaller than the height (approximately 200 microns) of the magnetic screening means. (The height is the dimension of these laminations measured at right angles to the record carrier).

The role played by the magnetic deflection means $MMD_1$ and $MMD_2$ is shown more particularly by FIG. 7b. In this figure, dash lines show the field line $H_1$ generated by passage of a current I through the magnetoresistance $MRI_1$, which line passes through the magnetoresistance $MRI_2$, the latter then being polarized at 45° in the case in which magnetic deflection means are assumed to be absent (or inoperative, which amounts to the same thing). In this case, the magnetic field $H_1$ penetrates into the magnetic screening means $MBI_1$ within a portion $Z_1$ situated close to the magnetic record carrier, and of which the height is substantially close to that of the magnetoresistances $MRI_1$ and $MRI_2$.

Let $HD_1$ be the magnetic field generated by passage of the same current I through the magnetoresistance $MRI_1$ when the magnetic deflection means $MMD_1$ of the transducer $TMRI_1$ is assumed to be operative. The line of this field $HD_1$ which passes through the magnetoresistance $MRI_2$, which is then polarized at 45°, has been shown by a solid line. It is apparent that this field line is distorted by the magnetic deflection means $MMD_1$, and this with respect to the field line $H_1$. It is deflected with respect to the latter in such manner that it penetrates into the magnetic screening means $MBI_1$ within a section $Z_2$ situated above the section $Z_1$ (in other words, the second $Z_2$ is farther from the record carrier SM than the section $Z_1$). It is evident that the intensity of the field $HD_1$ in the section $Z_2$ is lower than that of the field $H_1$ in the section $Z_1$ if there are no deflection means $MMD_1$, and that the volume and surface of the magnetic screening means $MBI_1$ exposed to this field $HD_1$ are smaller than the volume and surface of these same means which are exposed to the field $H_1$, if there are no magnetic deflection means.

Consequently, the magnetic charges generated by the magnetic field $HD_1$ inside and at the surface of the magnetic screening means $MDI_1$ and within and at the surface of the section $Z_2$ are distinctly smaller in number than the magnetic charges generated by the field $H_1$ within and at the surface of the section $Z_1$ (this is always so in the case in which the magnetic deflection means $MMD_1$ are assumed to be either absent or inoperative). It follows that the return field $H_{rd1}$ generated by the magnetic charges of the section $Z_2$ of the means $MBI_1$ in the magnetoresistance $MRI_2$ is very weak, on the one hand because the number of magnetic charges generated in the section $Z_2$ is small, but also because this section $Z_2$ is situated comparatively far from the magnetoresistances $MRI_1$ and $MRI_2$.

It is thus shown that the presence of the magnetic deflection means $MMD_1$ reduces the return field $H_{rd1}$ in an extremely substantial manner, and that the actions occur as though the magnetic screening means $MBI_1$ had no influence on the magnetic field $HD_1$ which polarizes the magnetoresistance $MRI_2$. In other words, because of the magnetic deflection means $MMD_1$, it is unnecessary to increase the value of the current in the magnetoresistance to obtain an angle of polarization of the latter of the order of 45°.

Consider now FIGS. 8a and 8b which illustrates a second preferred embodiment $TMRI_2$ of the magnetoresistant transducer in accordance with the invention.

The different components of this magnetoresistant transducer $TMRI_2$ in accordance with the invention are the following:

the magnetoresistances $MRI_3$ and $MRI_4$ which are parallel to each other and identical in type to the magnetoresistances $MRI_1$ and $MRI_2$ of the transducer $TMRI_1$ (same size, same anisotropic magnetic material, same positioning of the axes of easy and difficult magnetization, same angles of polarization).

deflection and screening means $MDB_3$ and $MDB_4$.

Thin non-magnetic insulating layers are placed on the one hand between the two magnetoresistances $MRI_3$ and $MRI_4$ and on the other hand between each of these magnetoresistances and the magnetic screening and deflection means $MDB_3$ and $MDB_4$ which are respectively adjacent to these, but they are not shown in FIG. 8a for obvious purposes of simplification.

The magnetic deflection and screening means $MDB_3$ comprise thin magnetic laminations $L_{31}$, $L_{32}$, $L_{33}$, $L_{34}$, $L_{35}$ separated from each other by thin non-magnetic insulating layers, i.e., $LIS_{31}$, between the magnetic laminations $L_{31}$ and $L_{32}$; $LIS_{32}$ between $L_{32}$ and $L_{33}$ between $L_{33}$ and $L_{34}$ and $LIS_{34}$ between $L_{34}$ and $L_{35}$. The thickness of the magnetic laminations $L_{31}$ to $L_{35}$ increases with increasing distance from the magnetoresistances $MRI_3$ and $MRI_4$, whereas the thickness of the non-magnetic layers separating these different magnetic laminations decreases with increasing distance from these same magnetoresistances. In other words, the thickness of the lamination $L_{31}$ for example is smaller than the thickness of the lamination $L_{32}$ which is itself smaller than the thickness of the lamination $L_{33}$... . etc...., whereas the thickness of the insulating lamination $LIS_{31}$ is greater than the thickness of the lamination $LIS_{32}$, which is itself greater than the thickness of the lamination $LIS_{33}$ ... etc.

This means that the magnetic coupling between the laminations which are closest to the magnetoresistances is smaller than the magnetic coupling between the laminations farthest from the magnetoresistances. Thus, the magnetic coupling between the laminations $L_{31}$ and $L_{32}$ is substantially weaker than the magnetic coupling between the magnetic laminations $L_{34}$ and $L_{35}$.

The deflection and screening means $MDB_4$ are strictly identical to the deflection and screening means $MDB_3$. They comprise:

the thin magnetic laminations $L_{41}$ to $L_{45}$ separated from each other by thin insulating laminations $LIS_{41}$ to $LIS_{44}$ of amagnetic material. In the same manner as for the means $MDB_3$, the magnetic coupling between the thin magnetic laminations closest to the magnetoresistances is weaker than the magnetic coupling between the thin magnetic laminations which are farthest from the magnetoresistances.

Consider now FIG. 8$b$ which illustrates the operation of the transducer $TMRI_2$ in accordance with the invention.

The lines of the magnetic field generated by the passage of a current I through the magnetoresistance $MRI_3$, being field lines passing through the magnetoresistance $MRI_4$ and allowing for polarization of the latter at an angle close to 45°, are illustrated in this same figure.

It is shown that, from the point of view of the operation of the transducer $TMRI_2$, the operation occurs as though the magnetic deflection and screening means $MDB_3$ could be divided into two parts, namely screening means $MB_3$ and deflection means $MD_3$. In these circumstances, a strictly identical operation to that described for the transducer $TMRI_1$ illustrated in FIG. 7$b$ may be made for the transducer $TMRI_2$.

In these circumstances, the magnetic field line $H_3$ generated by the passage of the current I through the magnetoresistance $MRI_3$ has been shown by dash lines, when the deflection means $MD_3$ is assumed to be absent or inoperative. The section of the screening means $MB_3$ exposed to the magnetic field $H_3$ is then denoted by $Z_3$ and it generates an appreciable return field, in view of this fact.

In the presence of the deflection means $MD_3$, assumed to be operative, the magnetic field $HD_3$ and its magnetic field line passing through the magnetoresistance $MRI_4$ is illustrated by an unbroken line. The section of the magnetic screening means $MB_3$ then exposed to the field $HD_3$ is then denoted by $Z_4$. It is then shown that the magnetic return field $H_{rd3}$ is very weak as compared to $HD_3$ and is practically ineffectual. Consequently, there is no need to increase the intensity of the current I to reach a value of the order of 45° for the angle of polarization.

It will be apparent that the description given for magnetoresistant transducers in accordance with the invention and comprising two magnetoresistant elements, is equally applicable to magnetoresistant transducers comprising either a single magnetoresistance or a greater number of magnetoresistances than two.

A line of reasoning strictly identical to that given to illustrate the operation of the transducers according to the invention having two magnetoresistances may be applied in the case of transducers comprising one magnetoresistance only or more than two magnetoresistances.

The invention is not, of course, in any way intended to be restricted to the foregoing detailed description of the embodiments as various modifications will suggest themselves to those skilled in the art. Accordingly, it is intended to encompass all such modifications which fall within the true spirit and full scope of the invention as defined in the following claims.

We claim:

1. A magnetoresistant transducer for reading data present in a magnetic area of a plurality of successive magnetic areas distributed along a track of a multi-track magnetic carrier, comprising:

at least one magnetoresistant element adapted to be aligned with said track opposite to said magnetic area and to be disposed perpendicular to the direction of travel of the carrier, the element adapted to be traversed by a current flowing in the direction of its length which current generates a magnetic field;

first and second magnetic screening means disposed at opposite sides of the element for intercepting magnetic flux generated by magnetic areas which enflank the magnetic area opposite which the element is situated; and first and second deflection means respectively located between said element and said first and second magnetic screening means for deflecting the magnetic field to minimize the creation of magnetic charges at said first and second screening means by said magnetic field and to minimize thereby the intensity at said element of magnetic return fields created by such magnetic charges.

2. A magnetoresistant transducer according to claim 1, comprising first and second mutually parallel magnetoresistant elements, and wherein said first and second deflecting means comprises first and second deflectors situated respectively between the first element and the first screening means and between the second element and the second screening means.

3. A magnetoresistant transducer according to claims 1 or 2, wherein each of the deflecting means includes a plurality of mutually parallel thin magnetic blades separated from each other by thin non-magnetic laminations the thickness of which is such that the magnetic coupling between two adjacent magnetic blades is comparatively weak.

4. A magnetoresistant transducer according to claim 3, in which the first and second magnetic screening means each comprise thin magnetic laminations separated by non-magnetic laminations such that the coupling between two adjacent magnetic laminations is comparatively substantial, the magnetic and non-magnetic laminations of the deflecting means and of the screening means having the same dimensions, the deflecting means and the screening means forming an integral deflecting and screening assembly, the thickness of the thin magnetic laminations increasing with increasing distance from the element and the thickness of the non-magnetic laminations decreases with increasing distance from the element whereby the magnetic coupling between the magnetic laminations which are closest to the element is weaker than the magnetic coupling between the laminations which are the farthest from the element.

5. A magnetoresistant transducer according to claim 4, wherein the element, and the deflecting means and the screening means are of an anisotropic magnetic material having respective axes of easy magnetization parallel to each other and having respective axes of difficult magnetization parallel to each other.

6. A magnetoresistant transducer for reading data present in a magnetic area of a plurality of successive magnetic areas distributed along a track of a multi-track magnetic carrier, comprising:
 magnetoresistant means for reading data from successive magnetic areas along the track, the magnetoresistant means carrying a current which generates a first magnetic field;
 first and second screening means spaced at opposite sides of the magnetoresistant means for intercepting second magnetic fields from magnetic areas other than that adjacent to which the magnetoresistant means is located; and
 first and second means disposed between the magnetoresistant means and the first and second screening means, respectively, for reducing the volume of the first and second screening means exposed to the first magnetic field and for reducing the intensity of the first magnetic field at the first and second screening means to reduce the value of a magnetic return field at the magnetoresistant means generated by magnetic charges produced at the first and second screening means by said first magnetic field.

7. A magnetoresistant transducer according to claim 6 wherein each of the reducing means includes a plurality of mutually parallel thin magnetic laminations separated from each other by thin non-magnetic laminations the thickness of which is such that the magnetic coupling between two adjacent magnetic laminations is comparatively weak.

8. A magnetoresistant transducer according to claim 6 wherein the first and second magnetic screening means each comprise thin magnetic laminations separated by non-magnetic laminations such that the coupling between two adjacent magnetic laminations is comparatively substantial.

9. A magnetoresistant transducer according to claim 8, wherein the first and second reducing means each comprise a plurality of thin magnetic laminations separated by non-magnetic laminations, and wherein the first screening means and the first reducing means form a first integral assembly and the second screening means and second reducing means form a second integral assembly, the thickness of the thin magnetic laminations of each assembly increasing with increasing distance from the magnetoresistant means and the thickness of the non-magnetic laminations of each assembly decreasing with increasing distance from the magnetoresistant means such that the magnetic coupling between the magnetic laminations which are closest to the magnetoresistant means is weaker than the magnetic coupling between the laminations which are farthest from the magnetoresistant means.

* * * * *